Feb. 12, 1935.                D. W. DEAN                1,991,083
                          ROTARY FLYING SHEAR
                   Filed Jan. 16, 1928        2 Sheets-Sheet 1
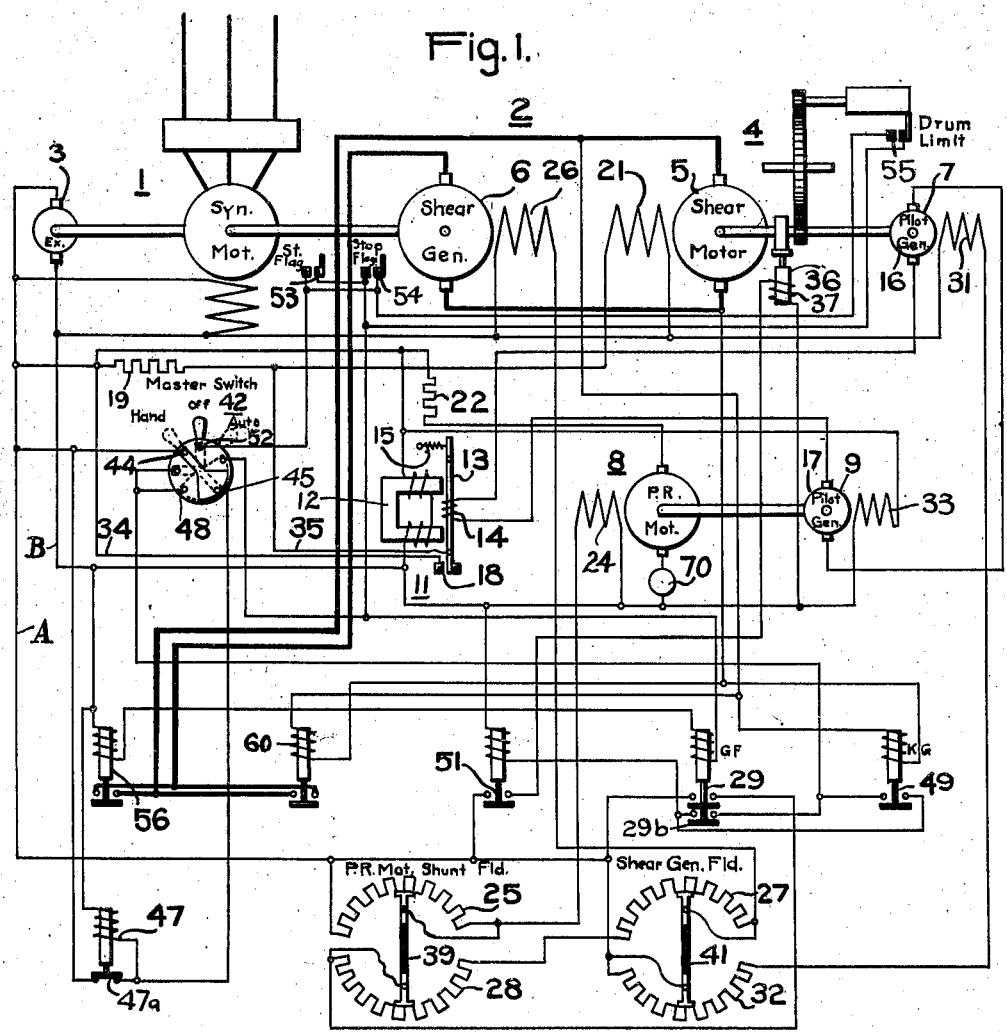
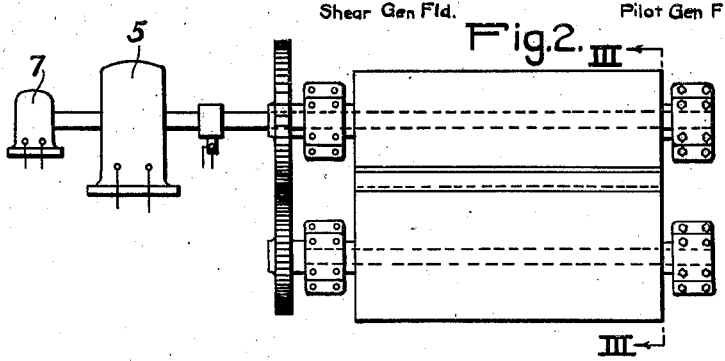
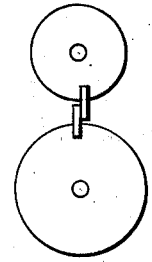
INVENTOR
Dale W. Dean
BY
Chesley G. Carr
ATTORNEY Feb. 12, 1935.  D. W. DEAN  1,991,083
ROTARY FLYING SHEAR
Filed Jan. 16, 1928  2 Sheets-Sheet 2
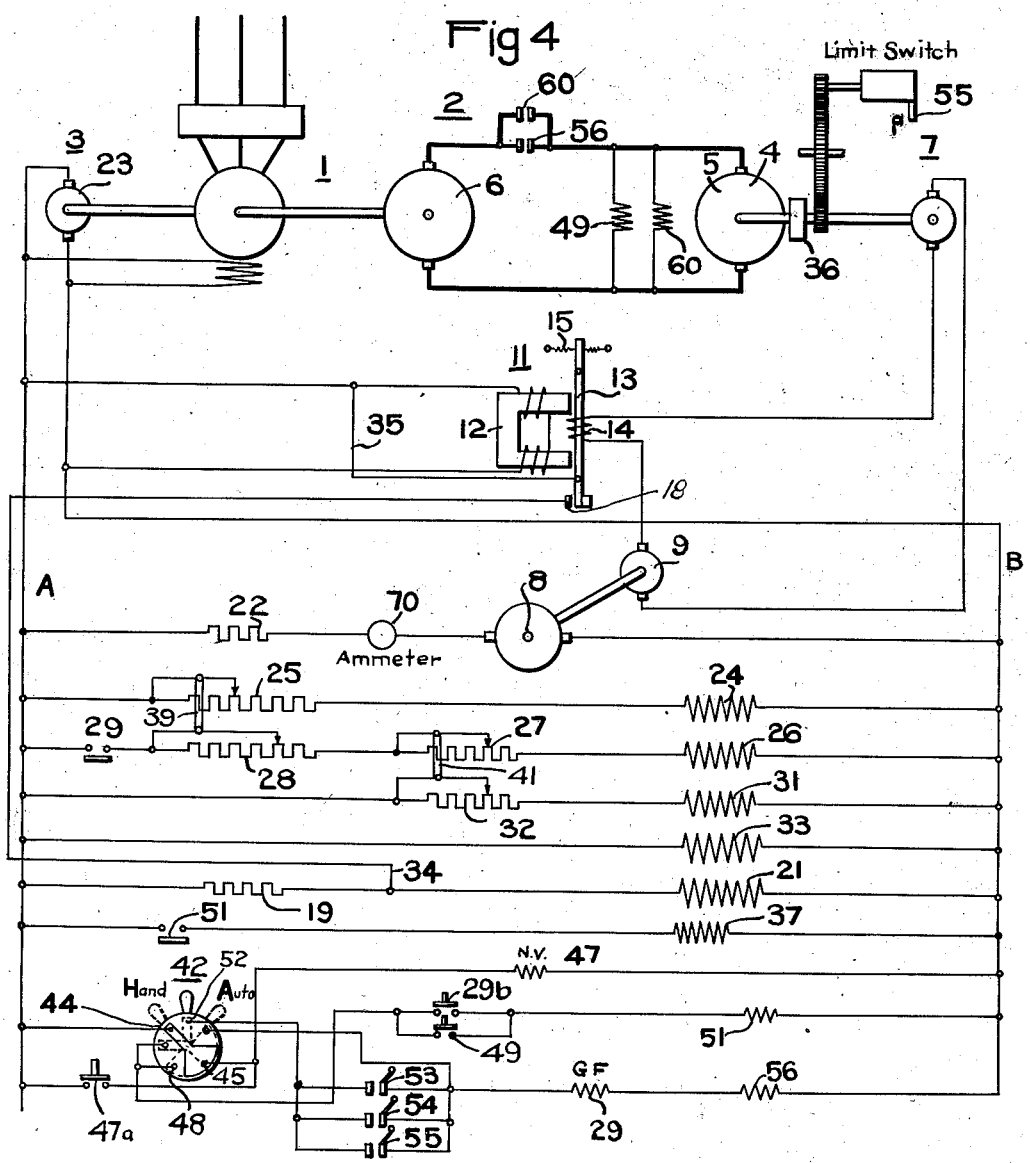
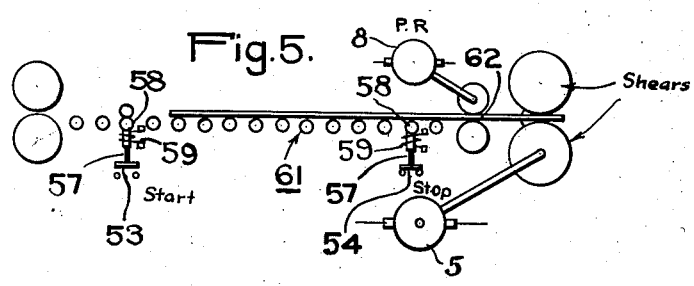
INVENTOR
Dale W. Dean.
BY
ATTORNEY Patented Feb. 12, 1935

1,991,083

UNITED STATES PATENT OFFICE 1,991,083

ROTARY FLYING SHEAR

Dale W. Dean, Wilkinsburg, Pa., assignor to Westinghouse Electric & Manufacturing Company, a corporation of Pennsylvania Application January 16, 1928, Serial No. 247,028

25 Claims. (Cl. 164—68)

The invention relates to motor-control systems and particularly to the controlling of a rotary-shear or metal-severing device.

The object of the invention, generally stated, is to provide control means for so operating a rotary shear that the speed of the shear may be regulated in accordance with the speed of the metal delivered to it to thereby effect the severing of metal strips in predetermined lengths.

A further object of the invention is to provide for stopping the shear when the blades of the shearing device are in a predetermined position.

It is also an object of the invention to provide for starting the shears at a predetermined time before the metal to be sheared enters the shearing device, in order to cut off the "crop end" of the stock in the first operation of the shear.

In the manufacture of strip steel used in the production of metal pipes and the like, it is desirable to be able to cut the long strips of metal issuing from the last stand of the rolling mill into given lengths without impeding the delivery speed of the stock. To accomplish this result, a device known as a rotary flying shear, more fully described hereinafter, is employed.

An important feature in an application of this character, where the shear must be run continuously during the cutting or shearing of long pieces of material, is that the speed relation of the shear to the delivery speed of the metal must be maintained substantially constant, in order that pieces of uniform length may be cut.

In order to maintain a desired speed relation between the flying shear and the delivered material, a pair of pilot generators and a speed regulator controlled by the generators may be employed. One of the generators is driven in accordance with the speed of the delivered material, and the other generator is driven in accordance with the speed of the flying shear. The generator driven in accordance with the speed of the delivered material may be coupled to the driving mechanism of the last stand of the rolling mill. However, in this application, the generator is illustrated as coupled to a driving motor that operates a pair of pinch rolls that are positioned immediately preceding the shear and disposed to be engaged by the moving material whereby they are caused to be driven at the same speed as the metal to be sheared. The other generator may be coupled to the shear motor. Accordingly, with a given excitation of each pilot generator, voltages will be generated that are a measure of the speeds at which the generators are driven.

The speed regulator for the shear-operating motor operates in accordance with the differential voltages of the pilot generators. The rotary flying shear may be actuated by any suitable variable speed driving mechanism which is referred to hereinbefore. The speed of the flying shear may, therefore, be maintained in a substantially constant relation, with respect to the linear speed of the delivered metal, by means of the regulating device.

In reducing ingots to steel strip, as is well known, there is a certain portion at each of the strips of stock known as "crop ends" which are unfit for use. In order that the shearing device may so operate, when a strip of metal is started through it, as to first cut one of the "crop ends" from the strip, and avoid unnecessary waste of good material, means is provided for stopping the shear with the shear blades in definite positions, after each strip of material has been cut, and to automatically effect the starting of the shear as the next piece of metal approaches the flying shear, at such a time as to predetermine the length of the first cut, or "crop end".

In this application, switches are provided which will be termed start and stop "flag" switches and which may be operated by the delivered metal for stopping and starting the shear-driving motor. In order that the shear blades may be stopped in the desired starting positions, regardless of the positions that they occupied when the stop flag switch was actuated, a drum-type limit switch is provided which permits stopping the shear motor only when the desired position is reached.

In order to more fully understand the invention, reference may be had to the accompanying drawings, in conjunction with the following description, wherein Figure 1 is a schematic view showing the control circuits and the apparatus employed in one embodiment of the invention.

Fig. 2 is a view, in side elevation, of the rotary shear.

Fig. 3 is a cross-sectional view of the shear heads and the shear blades.

Fig. 4 is a schematic single-line diagram of the system illustrated in Fig. 1, and Fig. 5 is a view, in side elevation, illustrating a piece of metal passing from a rolling mill over a rolling table, through a set of pinch rolls and a rotary shear.

Referring to the drawings, in which like parts are indicated by the same numerals in the several figures, and referring more particularly to Fig. 1, a synchronous motor 1 is shown coupled to drive a generator 2 and an exciter 3, the generator 2 providing power for the shear motor and exciter generator 3 providing excitation for the field windings and for the control circuits employed in the system. A motor 4 for actuating the rotary shear is illustrated having an armature 5 connected in loop-circuit relation to an armature 6 of the generator 2. A pilot generator 7 is suitably coupled to the shaft of the shear motor 4, for developing a voltage that varies in accordance with the speed of the shear.

A motor 8 is provided for operating the pinch rolls 62, which may be disposed, as shown in Fig. 5, directly preceding the shear, and which because of their direct engagement with the delivered material may be maintained at the same peripheral speed as the linear speed of the metal being delivered from the mill to the shear. A pilot generator 9 is provided and suitably coupled to the motor 8 and pinch rolls 62 for developing a voltage corresponding to the speed of these rolls and proportional at all times to the linear speed of the material.

For regulating the speed of the shear motor to correspond to the delivery speed of the metal being severed, a regulator 11 is provided comprising an electromagnet 12, and an armature 13 having a coil 14 disposed thereon. The armature 13 is normally biased to a circuit-opening position by a resilient member 15. The coil 14 is connected in series-circuit relation with the armature windings 16 and 17 of the pilot generators 7 and 9, respectively, which are connected to buck each other. This will cause the armature 13 to move to a circuit-closing position when current flows through the circuit in one direction and will aid in holding the armature in its circuit-interrupting position when the current in the circuit is flowing in the opposite direction. The contacts 18 of the regulator are so connected as to short-circuit a resistor 19 which is disposed in series-circuit relation with the field windings 21 of the shear motor 4, thereby affecting the speed of that motor, in accordance with variation in the speed relation of the shear and pinch roll motors.

A clearer conception of the control circuits may be had by referring to Fig. 4 of the drawings.

As is illustrated in Figs. 1 and 4, the pinch-roll motor 8 may be connected in series-circuit relation with a resistor 22 between the supply conductors A and B. The supply conductors A and B are connected to the armature 23 of the exciter generator 3 and provide a source of power for the control circuits of the system.

In order to supply a field for the pinch-roll motor and provide for varying the speed of that motor, the field windings 24 may be connected across the conductors A and B in series-circuit relation with a variable resistor 25.

A field is provided for exciting the main generator 2 by connecting the field windings 26 in a circuit leading from line conductor B through the winding 26, the variable resistors 27 and 28, which are employed for varying the field strength and the contacts of the generator field contactor 29 to conductor A. In order to excite the pilot generator 7 coupled to the shear motor 4, the field windings 31 may be connected in a circuit leading from conductor B through the field windings 31 and variable resistor 32 to the line conductor A, the variable resistor 32 being provided for varying the field. The field windings 33 of the pilot generator 9 may be connected directly across the line conductors A and B, and the shear motor 4 may have its field windings 21, as has been referred to hereinbefore, connected across conductors B and A in series-circuit relation with the resistor 19. A circuit is provided in shunt relation to the resistor 19 through the contact members 18 of the regulator 11, and conductors 34 and 35.

In order to aid in decelerating the shear motor, a magnet brake 36, of a well-known construction, may be provided and coupled to the shaft of the shear motor, as illustrated in Figs. 1 and 4. The brake may be normally biased to its operating position and held released by the brake coil 37, when energized.

In order that the control of the pinch-roll motor and the shear generator may be accomplished with the minimum amount of effort, the variable resistors 25 and 28 may be so arranged that the setting of the two resistors to a selected position for a desired speed regulation may be simultaneously effected by means of a member 39. Also, a single varying mechanism 41 is provided for adjusting the resistors 27 and 32 in the field circuits of the generator 2 and the pilot generator 7.

This unitary control feature is desirable, since these circuits must be altered to vary the lengths of material cut by the flying shear, inasmuch as the length of the cut is dependent upon the speed of the shear motor, as compared with the speed of the delivered metal.

The embodiment of the invention, here illustrated, is adapted to be controlled automatically or manually, and a two-point master switch 42 is provided for selecting whether automatic or manual control is to be used.

Assume that the master switch 42 is in its "off" position and that the motor 1 is operating. The exciter 3 will also be operating and supplying voltage to the conductors A and B. The circuits previously described as connected directly across the line conductors A and B will, accordingly, be energized. A circuit is made leading from line conductor A through the contact points 44 and 45 of the master switch 42 and the actuating coil of a no-voltage relay 47 to the conductor B. The no-voltage relay 47 will, therefore, close its contact member 47a and provide a holding circuit for itself, as illustrated.

To effect automatic operation of the system, hand master switch 42 is actuated to the automatic operating position, as indicated in the drawings. In this position, current will flow from the conductor A, through the low-voltage relay 47, binding post 45 of the master switch 42, the bridging member of the master switch, binding post 48 through contact members 29b of the generator field relay 29, or the contact members of relay 49, which is connected in parallel-circuit relation to the relay 29, and the actuating coil of contactor 51, to the conductor B. At the same time, a circuit is provided for actuating the relay 29 and the contactor 56 which may be traced from the bridging member of the switch 42, in its automatic position, through contact point 52, the starting and stopping flag switches 53 and 54, or the drum limit switch 55, which are connected in parallel-circuit relation, the actuating coils of the field relay 29 and the main-motor-circuit contactor 56 to conductor B.

The flag switches 53 and 54 accomplish automatic starting and stopping of the shear motor, and the drum switch 55, which is illustrated as being coupled to the shear motor 4, predetermines the position at which the shear motor will stop when the blades of the shear are in predetermined positions.

The switches may be of any suitable type. The flag switches, as illustrated in Fig. 5, each consists of a contact-carrying member 57 which has a roller 58 mounted at the top and a resilient member 59 suitably mounted and normally biasing the switch to its open-circuit position. The switches, as illustrated in Fig. 5, are mounted on the roll table, with their rollers extended above the level of the table top. Accordingly, as a piece of metal is passed along the table, it will first close the start flag switch 53, and then the stop flag switch 54, and retain the latter closed until after metal has passed completely over it.

The drum limit switch 55, as illustrated in Figs. 1 and 4, is suitably coupled to the driving shaft of the shear motor 4, the contact members being disposed to maintain the switch closed at all periods except when the shear blades of the flying shear are in a predetermined position. Inasmuch as there are a number of limit switches of this character known to the art, further description of same is deemed unnecessary.

Assume now that a driving motor 1 of the motor-generator set has been started and a piece of metal is being run out from the rolling mill upon the table 61, by means of which it is conveyed to the flying shear. As the strip passes over the starting flag switch 53, it causes a circuit to be established which is traced from the master switch through the actuating coils of the generator-field relay 29, and contactor 56, to conductor B, effecting the closing of the generator-field relay 29 and the main contactor 56.

The closing of relay 29 completes a circuit through the generator field windings 26, providing excitation for the shear generator 2 and a circuit through the contact members of contactor 56, closing that contactor and placing the armature 5 of the shear motor in series relation with the armature 6 of the shear generator, causing the shear motor to start to rotate. At the time that the generator-field relay 29 closes, the interlock 29b, on that relay completes a circuit which may be traced through the actuating coil of contactor 51, which, when closed, energizes the releasing coil 37 of the brake 36, thereby releasing the brake.

The shear will now continue to run, causing the metal passing through it to be severed in sections, as predetermined in accordance with the comparative speed of the metal as it passes through the pinch rolls 62, and the shear until it has passed over the stop flag switch 54. The position of the shear blades on the rotary shear may not be in their proper stopping position when the stop flag switch 54 opens, in which case, the circuit for maintaining the shear motor in operation will be maintained until the drum limit switch arrives at such position that its contact members 55 will be opened and the motor stopped in the position desired. The generator-field relay 29 and the main-line contactor 56 will fall open, interrupting their respective circuits, and stopping the motor immediately upon the opening of the flag switches and drum limit switch.

The opening of the generator-field switch 29 interrupts the circuit through the actuating coil of contactor 51, deenergizing the brake-holding coil 37 permitting the brake 36 to aid in stopping the motor. In order to provide dynamic braking for the shear motor, a contactor 60 is provided, which has an actuating coil connected directly across the terminals of the shear motor. Consequently, it will be closed at all times that there is voltage across the terminals of the shear-motor armature.

Contactor 60, therefore, places the armature 6 of the shear generator in series relation with the shear motor to effect dynamic braking of the motor until its voltage has fallen to such value as to release the actuating coil of contactor 60. Thus, the shear motor, through the combined effect of the established dynamic-braking circuit and the electromagnetic brake, will be rapidly brought to rest. The drum limit switch, aided by the electromagnetic brake, will, therefore, cause the shear to be stopped in such position as to effect the proper cutting of the crop end of the next length of stock, and, with each succeeding piece of metal to be cut, the procedure just referred to will be repeated.

In order to make the shear motor operate independently of the automatic start and stop flag switches and the drum limit switch, the master switch may be pushed to the indicated hand-operation position, in which position the circuit from the bridging member of the master switch, instead of being completed through the automatic switches, as referred to hereinbefore, is connected in series relation with the field-generator relay 29 and the shear-motor contactor 56.

Accordingly, when the master switch is in the hand-operation position, the shear motor will be run continuously until the master switch is pushed to its "off" position.

It will be observed that variable resistors 27 and 32, are provided for varying the voltage of the shear generator and the pilot generator 7. Accordingly, the speed of the shear motor may be changed by shifting resistor 27, and the voltage of the pilot generator 7 held at its original value by adjusting resistor 32.

The coil 14, mounted on the armature 13 of the regulator 11, being in series relation with the two pilot generators, will be affected by this change in voltage, inasmuch as the current passing through the coil will depend upon which of the two pilot generators 7 or 9 is generating the higher voltage. A flow of current through the coil 14 will cause the armature 13 to be actuated to control the effective value of the speed of the shear motor.

Thus, the shear motor will change its speed until the voltage generated by pilot generator 7 is the same as that generated by pilot generator 9.

In order for the pinch-roll motor to respond to any changes in speed in the delivered metal, the motor may be constructed with a drooping speed characteristic, and adjusted to rotate at a speed somewhat in excess of the linear speed of the strip when no metal is passing through the pinch rolls. Accordingly, when the strip enters the pinch rolls they will exert a slight tension on the metal, and the motor will be slowed down because of the increased load to a speed exactly proportional to the linear speed of the strip.

In order that the operator may be able to tell whether the pinch-roll motor is running properly, an ammeter 70 may be placed in the armature circuit of the pinch-roll motor, for indicating the load conditions upon that motor at all times.

The variable resistor 25 is provided for regulating the speed of the pinch-roll motor, and is connected in series-circuit relation with the field winding 24. If the desired speed of the pinch-roll motor is approximately 10% more than the linear speed of the metal, the operator can readily so adjust the field rheostat or resistor 25 of the pinch roll motor that the indicating ammeter shows a load somewhat in excess of friction load, indicating that the pinch rolls are pulling slightly on the metal, this being an indication to the operator that the pinch-roll-motor-field adjustment is correct.

It is desirable to use a low-inertia motor for driving the shear so that the shear will be very quickly accelerated to a uniform speed to properly shear the crop end of the metal. The length at which the "crop end" is to be cut may be varied by adjusting the distance of the start flag switch from the shear or by changing the effective position of the drum limit switch.

If a change in the shear length is desired, the operator adjusts the field rheostat 32 employed in the field circuit of the pilot generator 7. This adjustment will cause the shear motor to operate slower or faster with respect to the speed of the pinch rolls, or with respect to the delivery speed of the metal being sheared, depending upon the direction in which the rheostat is turned. The pilot generator rheostat may be marked when the rheostat is put into service to indicate the positions corresponding to various lengths to be sheared.

It is to be understood that the pinch rolls 62 do not function to actually feed the metal to the rotary cutters of the shear. The real function of these rolls is to cause the pilot generator 9 to develop a voltage which is at all times exactly proportional to the linear speed of the moving metal which is fed to the shear directly from the rolling mill.

Since it is not intended that the pinch rolls 62 be used as a feeding device, it is evident that the pinch roll motor 8 need only be of such capacity as to rotate the pinch rolls and drive the pilot generator 9 when there is no material moving through the shear.

As set forth hereinbefore, the pinch-roll motor is caused to actuate the pinch rolls, when not engaged by the moving material, at a slightly greater speed than the linear speed of the material when it is fed to the shear, which causes the pinch rolls to exert a slight pull on the material, the amount of which is indicated by the current drawn by the pinch-roll motor.

It is evident that, when the pinch rolls are operated in the foregoing manner, their engagement with the moving material, as it is fed to the shear from an independent source, causes the pilot generator 9 to be actuated in such manner as to develop, or produce, a voltage which is at all times proportional to the linear speed of the moving material.

Another function of the pinch-roll motor is to rotate the pinch rolls at approximately the same speed as the speed at which the material is to be delivered, in order that these rolls will properly receive the moving material and thereby effect an immediate adjustment of the voltage of the pilot generator 9, which is necessary in order to cause the regulator 11 to properly adjust the speed of the shear-actuating motor.

While I have described a preferred embodiment of my invention, various changes may be made in the apparatus and circuits employed without departing from the spirit of the invention. Accordingly, it is desired that only such limitations shall be imposed as are indicated in the appended claims.

I claim as my invention:

1. In a shearing apparatus, a rotary shear for shearing moving material as fed thereto, a motor for actuating the shear and electro-responsive means for controlling the speed of the shear-actuating motor, said speed-controlling means being responsive to changes in the relative speeds of the shear-actuating motor and the moving material which is fed to the shear, thereby to maintain a predetermined ratio between the speed of the shear and the linear speed of the moving material.

2. In a shearing apparatus provided with rotary cutters for shearing moving material as fed thereto, in combination, a motor for actuating the rotary cutters, a generator for supplying power to the motor, a line switch for connecting the motor to the generator, a switch for controlling the generator excitation, means disposed to be actuated by the moving material as it approaches and leaves the shear for controlling said line switch and generator-field switch, and a switch disposed to be closed in response to the closure of the line and generator-field switches to establish a bridging circuit around the line switch, said bridging switch being disposed to remain closed subsequent to the opening of the line and generator-field switches until the counter-electromotive force of the motor has been reduced to a predetermined value, thereby to maintain a dynamic-braking circuit for the motor through the generator armature.

3. In a shearing apparatus having cutters disposed to be continuously rotated to operate upon a piece of moving material as fed thereto, in combination, means for actuating the shear continuously to perform cutting operations, means operable to effect changes in speed of said shear-actuating means comprising means individually actuated by said shear-actuating means and in accordance with the speed of the moving material for effecting the operation of said speed-changing means to maintain a predetermined speed ratio between the shear-actuating means and the material being operated upon, thereby to provide for cutting said moving material into predetermined lengths.

4. In a shearing apparatus provided with rotary cutters for shearing moving material as fed thereto, in combination, a motor for actuating the shear, means for varying the voltage supplied to said motor to predetermine its operating speed, electro-responsive means for controlling the excitation of the motor for varying its speed above and below the predetermined speed, means disposed to be actuated in accordance with the speed of the motor and the moving material, respectively, for effecting the operation of said motor-excitation-controlling means to maintain a predetermined speed relation between the motor and the material, regardless of changes in speed of the moving material.

5. In a shearing apparatus provided with rotary cutters for shearing moving material as fed thereto, in combination, a motor for actuating the rotary cutters, a generator for supplying power to the motor, means for controlling the voltage developed by the generator to control the speed of the shear motor, means for controlling the excitation of the motor for further controlling the speed, and means for effecting the operation of said excitation-controlling means, said means being disposed to respond to variations in the speed ratio between the rotary cutters and the moving material, thereby to maintain a pre-selected speed ratio.

6. In a shearing apparatus provided with rotary cutters for shearing moving material fed from an independent source and pinch rolls, in combination, a motor for actuating the cutters to perform shearing operations, means actuated by the cutter-actuating motor for developing a voltage proportional to the speed of the cutters, means actuated by the pinch rolls for developing a voltage proportional to the linear speed of the material engaged by said rolls, and a vibrating regulator disposed to control the speed of the cutter-actuating motor, said regulator being responsive to the variations in the relative voltages developed by the voltage-developing means actuated by the cutter-actuating motor and the pinch rolls, respectively, to automatically effect speed variations of the rotary cutters proportional to speed variations of the moving material being operated upon.

7. In a shearing apparatus provided with rotary cutters for shearing moving material as fed thereto, in combination, a motor for actuating the rotary cutters, a pilot generator disposed to develop a voltage proportional to the speed of the rotary cutters, a second pilot generator disposed to develop a voltage proportional to the speed of the moving material, and means responsive to the difference of the voltages developed by the pilot generators for controlling the speed of the cutter-actuating motor, thereby to maintain a predetermined speed ratio between the rotary cutters and the moving material.

8. In a shearing apparatus provided with rotary cutters for shearing moving material as fed thereto and pinch rolls disposed to be controlled by the material, in combination, a motor for actuating the rotary cutters, a motor for actuating the pinch rolls, manually-operable means for varying the speed of the pinch-roll motor to cause said pinch rolls to maintain the same speed at which the material is fed to the shear, means for controlling the speed of the cutter-actuating motor, said controlling means being jointly responsive to the speed of the cutter-actuating motor and the pinch rolls to maintain a pre-selected speed relation therebetween, and means for varying the effect of said controlling means to cause the cutters to be actuated at any desired speed relation with respect to the speed of the moving material.

9. In a shearing apparatus provided with rotary cutters for shearing moving material as fed thereto and pinch rolls disposed to be engaged by the materal, in combination, a motor for actuating the rotary cutters, a motor for actuating the pinch rolls, manually-operable means for varying the speed of the pinch-roll motor in accordance with the speed at which the material is fed to the shear, a regulator for controlling the speed of the cutter-actuating motor, a plurality of pilot generators actuated by the cutter-actuating motor and the pinch rolls, respectively, for effecting the operation of the regulator, said regulator being disposed to respond to a predetermined unbalance between the voltages developed by the pilot generators to control the speed of the cutter-actuating motor in accordance with the speed of the pinch rolls as influenced by the moving material, and means for controlling the voltage developed by one of said pilot generators for causing the regulator to maintain different speed ratios of the cutter-actuating motor and the pinch rolls to vary the length of the cut.

10. In cutting apparatus of the kind described, a rotary shear for cutting moving material delivered thereto by a feeding means at a varying speed, a variable-speed motor for actuating the shear, a source of power for the motor, means for varying the voltage of the power source to vary the speed of the motor, and means independent of the feeding means and responsive to the speed of the moving material for further controlling the speed of the shear-actuating motor, said speed-controlling means being disposed to vary the speed of the shear-actuating motor in accordance with the changes in speed of the material fed to the shear.

11. In cutting apparatus of the kind described, a rotary shear for operating on material fed thereto at a varying speed, a motor for actuating the rotary shear, means for initially adjusting the speed of the motor, and means for controlling the speed of the motor to govern the speed of the rotary shear, the functioning of the speed-controlling means being dependent upon the relative speeds of the moving material and the motor.

12. In a shearing apparatus provided with a rotary shear for operating on material fed thereto at a varying speed, a motor for actuating the rotary shear, means for initially adjusting the speed of the motor, a regulator for controlling the speed of the shear-actuating motor, means for impressing a predetermined voltage across the regulator, and means for varying the voltage impressed across the regulator in accordance with the speed of the moving material, thereby to vary the speed of the shear motor in accordance with the speed of the moving material.

13. In a shearing apparatus, a rotary cutter adapted to cut moving material as fed thereto, a motor for actuating the rotary cutter, a source of power for the motor, and means including an electrically-operated regulator responsive to the linear speed of the moving material for controlling the excitation of the cutter-actuating motor, thereby to cause the speed of said motor to continuously conform to the linear speed of the material to be sheared as it continuously moves through the cutter apparatus.

14. In a shearing apparatus, a rotary shear disposed to cut moving material as fed thereto from a source independent of the rotary shear, a motor for actuating the shear, a source of power for the motor, means for adjusting the speed of the motor to approximate the speed at which the material is to be fed to the rotary shear, and means controlled in accordance with the linear speed of the moving material and operable to vary the excitation of the shear-actuating motor to cause the speed of said motor to vary in accordance with variations in the linear speed of the material.

15. A system for controlling the speed of an actuating motor for cutter apparatus disposed to operate upon moving material received from an independently controlled source comprising an actuating motor, a source of power for the motor, means for initially adjusting the speed of the motor to cause the shear to be operated at a speed approximately proportional to the speed at which the material is to be delivered to the shear, and regulator means for controlling the excitation of the motor to control its speed independently of the initial-adjusting means, said means being disposed to maintain a substantially constant motor speed before the material is delivered to the shear and to respond to the speed of the moving material as it approaches the shear to cause a predetermined speed relation to be maintained between the shear actuating motor and the moving material.

16. In a motor-control system for a flying shear provided with rotary cutters for shearing moving material, comprising a motor for actuating the rotary cutters, a source of variable-voltage power for the motor, a regulator for controlling the field excitation of the motor, means for effecting the operation of the regulator in accordance with the relative speeds of the motor and the moving material to cause the speed of the motor and rotary cutters to follow the variations in the linear speed of the moving material, and means operable to vary the voltage of the power source to change the speed of the motor, said means being disposed to simultaneously effect a proper readjustment of the regulator operating means to render the regulator effective to maintain the speed relation between the motor and the moving material as established by the change in the operating speed of the motor.

17. In a shearing apparatus, a rotary shear adapted for shearing moving material, variable-speed means for driving the shear, and means responsive to both the speed of the shear and the speed of the moving material for automatically regulating the relative speed of the shear-driving means to correspond to the speed of the material entering the shear.

18. In a shearing apparatus, a rotary shear adapted for cutting strips of moving material into pieces of a predetermined length, variable-speed means for driving the rotary shear, manually operable means for regulating the speed of the shear driving means, and means responsive to the speed of the moving material and to the speed of the shear driving means for automatically maintaining the speed relation between the shear and the material substantially constant.

19. Apparatus for cutting a moving strip of material into lengths comprising a rotary shear, means for driving the shear, and means jointly responsive to the speed of the shear and the speed of travel of the strip for controlling the speed of the driving means to maintain a predetermined speed relation between the shear and the strip as it is moving therethrough.

20. Apparatus for cutting a moving strip of material into lengths comprising a rotary shearing device, a motor for driving the shearing device, means for energizing the motor as long as the strip is in shearing position, and means operable to control the speed of the motor, said means being actuated in accordance with the relative speeds of the shearing device and the moving material.

21. Apparatus for cutting a moving strip of material into lengths comprising a rotary shear adapted for continuous operation, means including a motor for driving the shear, independent means for feeding the moving strip to the shear, and speed control means for the shear driving motor responsive both to variations in the speed of the rotary shear and the speed of the strip for continually maintaining a predetermined speed ratio between the speeds of the shear and the strip.

22. A shearing apparatus comprising a rotary shear adapted for shearing moving material into lengths, variable-speed means for driving the shear, and means including a regulator device jointly responsive to the speed of the material and the speed of the shear for controlling the speed of the shear driving means to maintain a predetermined relation between the speed of the moving material and the speed of the shear.

23. Apparatus for cutting a moving strip of material into lengths comprising a rotary shear, a motor for driving the shear, a variable-voltage generator for supplying power to the shear motor, means responsive to the leading end of the moving strip as it approaches the shear for connecting the generator to the shear motor, means, jointly responsive to the speed of the strip and the speed of the shear, for controlling the speed of the shear motor and means responsive to the trailing end of the moving strip for disconnecting the shear motor from the generator.

24. Apparatus for cutting a moving strip of material into lengths comprising a rotary shear, means for driving the shear, means jointly responsive to the speed of the shear and the speed of the strip for controlling the speed of the shear driving means to cause the shear to make predetermined cut lengths successively regardless of variations in the speed of the moving strip, and means for varying the speed of the shear driving means and for controlling the operation of said last-named means to cause said means to maintain any desired speed relation between the shear and the strip in order to vary the cut length.

25. Apparatus for cutting a moving strip of material into lengths comprising a rotary shear, a motor for driving the shear, a generator for supplying variable-voltage power to the shear, regulator means jointly responsive to the speed of the shear and the speed of the moving strip for controlling the excitation of the shear motor to maintain a predetermined relation between the speed of the shear and the speed of the strip, means operable to vary the generator voltage to change the speed of the shear with respect to the speed of the moving material to change the cut length, and means operable to vary the adjustment of the regulator means to correspond to the relative speed relation between the shear and the strip established by varying the generator voltage.

DALE W. DEAN.